Aug. 11, 1936.                    W. R. OST                    2,050,728
              PIPE JOINT AND FITTING AND METHOD FOR MAKING THE JOINTS
                            Filed Jan. 20, 1934
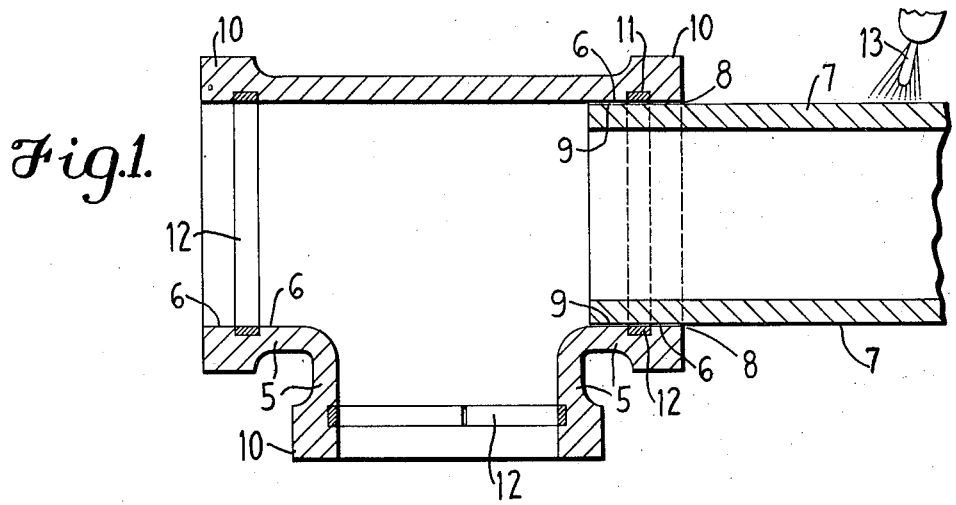
Fig.1.
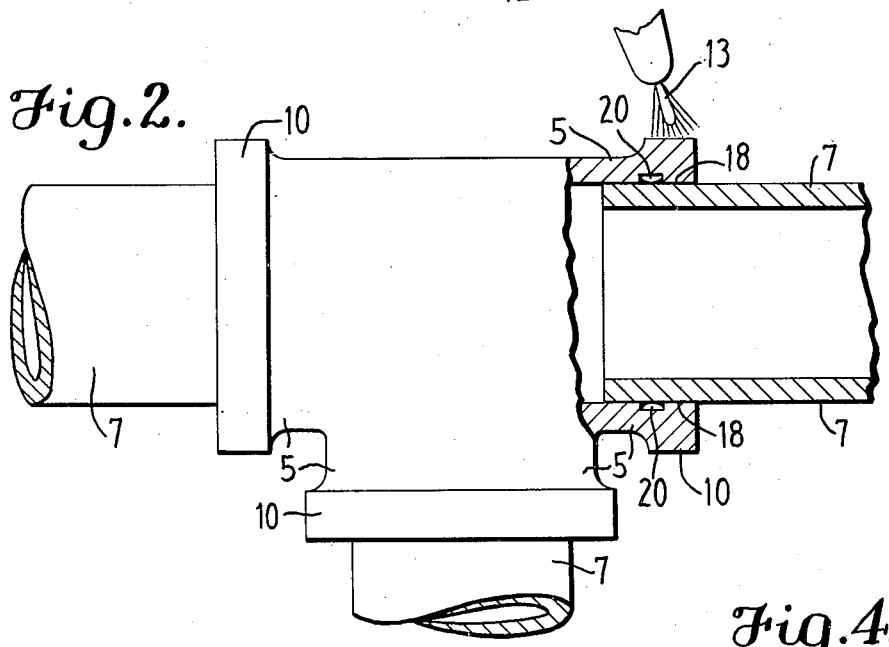
Fig.2.
Fig.3.
Fig.4.
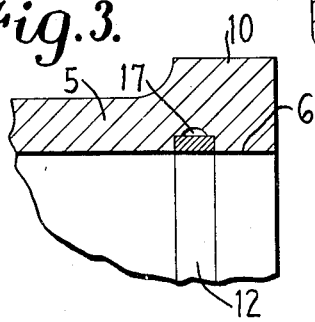
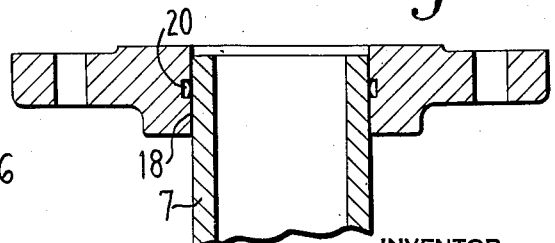
INVENTOR
William R. Ost
BY
ATTORNEY Patented Aug. 11, 1936

2,050,728

UNITED STATES PATENT OFFICE 2,050,728

PIPE JOINT AND FITTING AND METHOD FOR MAKING THE JOINTS

William R. Ost, Verona, N. J., assignor to Air Reduction Company, Incorporated, New York, N. Y., a corporation of New York Application January 20, 1934, Serial No. 707,486

10 Claims. (Cl. 29—148.2)

The objects of this invention are to provide an improved type of pipe joint and method of making the same, and a novel fitting for the carrying out of the method and the production of the joint.

This invention relates to joints between tubular members and fittings, and more especially to joints between pipe-fittings and pipe in pipe systems for conducting liquids or gases, both hot and cold, or for transmitting fluid pressure or vacuum. Such systems are composed of fittings of various forms, such as elbows, T's, Y's, couplings, reducers, etc., and of pipe or tube cut to lengths as required. In plumbing systems and in many other piping systems the customary and practically universal form of joint is a taper threaded connection. For certain purposes, and more especially with larger sizes of pipe and fittings, flanged connections are employed. These are the two general kinds of connection.

The joint of this invention resembles a screw joint in this, that the pipe or tube enters the fitting and that there is an internal seal and connection between the pipe and fitting. The object of the invention is to provide a joint which is a superior substitute for threaded joints, and which because it benefits from a massive section in the fitting, is equally suitable for conduits and fittings of comparatively large size (up to 8" and above). A further object is to provide a superior joint which can be used with copper and brass, and also with ferrous pipe.

The amount of labor and skill required for making good threaded joints throughout a system, and the leakage that so frequently develops, have long offered the incentive for the introduction of easier methods and surer seals. In the ordinary system the pipe lengths must be threaded on the job, and if the threads are cut either too long or too short a weak and perhaps leaky joint is produced. In the case of brass or copper systems, the softer and more ductile metal makes it more difficult to produce good threads than is the case with ferrous materials, and it is important to use special dies for threading, as well as special wrenches which will not injure the pipe when the joints are screwed up. Poor joints are so commonly made in brass and copper systems that it is not only customary to use fillers of red lead and the like but it is also common, though disapproved, practice to pack the joints with wicking.

To some extent fabricated welded systems, using no fittings as such, have come into use, and it has also been proposed to butt-weld the pipe to pre-formed fittings, both of these plans being for use with ferrous metal and requiring the application of fusion welding technique. For pipe and fittings of copper or copper alloy metals, soldered joints between entering pipe ends and surrounding fittings have been introduced. While it has been proposed to provide such a fitting with an internal ring of solder, to be melted by heat applied to the outside of the fitting, the actual practice is to feed the solder in through a hole in the wall of the fitting to an internal distributing groove, from which it passes by capillary action between the sealing surfaces of the pipe and fitting, the fitting being first heated by a gasoline blow-torch to a temperature at which the soft solder wire will melt. The services in which such soldered joint systems can be used are limited to low temperatures of the order of 400° F. and comparatively low pressure in relation to pipe diameter.

It is, of course, obvious that a pipe system having brazed joints, made with a bond metal having a melting point well above 1000° F., would have far greater strength than a soft solder joint and would withstand much higher temperatures. In practice, however, there has been very little brazing of joints in pipe systems, the reason being, I believe, that a sufficiently practical and satisfactory method for making such joints has not heretofore been devised. The particular object of my invention is to provide a simple, sure and economical way of brazing pipe fittings to pipe, to produce a high strength and high melting joint, and of course a leak-proof joint.

In the course of experiments which resulted in this invention I found that a great difficulty lay in distortion and cracking and alteration of the physical properties of the cast or forged fittings under the heating required to melt brazing metal. Whereas for soft soldering it is not necessary to heat the fittings unduly, brazing, which calls for a much higher temperature, makes it very difficult to avoid spoiling the fitting if it is heated and a brazing wire is fed in through a hole in the fitting in accordance with the practice for making soldered joints which has been described. Another method that I tried was to place the brazing metal on the pipe outside the ends of the fitting so that, when melted, it would be drawn by capillary action into the seal area between the pipe and the socket of the fitting. In both of these methods much metal and labor were lost by overheating, there was little certainty of the amount of braze material in the joints, and considerable manipulation was required to get the molten brazing alloy to flow into the seal area.

The solution of the problem involved placing an adequate amount of brazing material as an insert inside the socket of the fitting, intermediate the ends of the seal area, and after inserting the pipe into the socket of the fitting, fusing the high-melting point insert by introducing within the fitting a considerable part at least of the heat required to bring about the union, by sending this heat in through the pipe rather than by applying so much heat to the fitting that the latter becomes injured before sufficient heat reaches the joint area to melt the bond metal and cause it to flow. In this method a high-temperature heat source, such as an oxyacetylene flame may be used to advantage. This heat is applied to the pipe a short distance from the fitting, or at a substantial distance from it if necessary. The pipe, whether of copper, brass or iron or steel, may be thus heated, without injury, to a temperature above the melting point of the brazing insert, and the heat is conducted through the metal of the pipe to its end inside the fitting. At the same time the pipe is expanded by the heating until it closes the initial clearance between the pipe and the internal wall of the socket of the fitting, and thereupon a considerable compression is set up, with the result that, by virtue of the intimate contact between the pipe and the fitting, the surface heat of the pipe is readily transmitted to the inner surface of the fitting and to the insert. The brazing metal, having become molten, is usually locked in temporarily by the tight contact between the sealing surfaces. Up to this time, the fitting has preferably been heated comparatively little or substantially not at all. In order to complete the joint quickly, heat may now be applied to the outside of the fitting until the fitting becomes heated just sufficiently to expand it somewhat away from the pipe and create a crevice through which the brazing metal instantly moves in both directions from the recess where it was held.

However, I have found that it is not necessary in all instances to heat the fitting to expand it away from the pipe after the brazing alloy has been melted, since by merely discontinuing the heating of the pipe and allowing it to cool and shrink slightly, a crevice will be established and the bond material will still be molten and will penetrate thoroughly between the surfaces.

The construction of the fittings and the width of the initial clearances between the pipe and fittings are also factors. The clearance must not be too great, else the fitting may become overheated by radiated heat before the pipe has become tightly expanded within the socket; furthermore, prolonged indirect, radiant heating of the fitting would tend to expand it away from the pipe while the pipe is expanding to meet it. On the other hand, if the initial clearance is too small the parts may become overstressed before the surface temperature inside the fitting is adequate to melt the brazing metal. To illustrate this, it may be stated that for copper pipe and bronze fittings best results are obtained with an initial radial clearance of between 0.002 and 0.005 of an inch.

The braze metal insert is held in a groove in a cylindrical bore of the fitting. The groove need not necessarily extend all the way around and might be replaced by a suitable number of recesses with inserts therein. It is preferable, however, that the insert be held in a heavy section of the fitting, which is preferably about twice the thickness of the pipe metal, and may be much greater. This prevents expansion of the fitting in advance of the compression action and insures that the braze metal insert will be melted before the heavy section absorbs enough heat to do it harm. For these reasons the fittings are provided with heavy external thickenings at the ends of the sockets, the insert recesses being formed on the inside of these massive sections.

In the accompanying drawing, forming part hereof:

Fig. 1 is an axial section through a T fitting, and a portion of a pipe inserted in one of the sockets of the fitting, preparatory to the making of the joint, the application of a torch flame to the pipe being indicated;

Fig. 2 is a view partly in elevation and partly in section, showing the completed joint;

Fig. 3 is a fragmentary sectional view of a portion of a fitting embodying a modification; and Fig. 4 is a section through a joint between a pipe and a flange made in accordance with the invention.

It is sufficient to illustrate in the drawing two forms of fittings, namely a T and a flange, since the various forms of fittings used in pipe systems are familiar and the application of the invention to all of them is similar. The term "fittings" as used herein is intended to include valves.

In Fig. 1 the socket portions 5 of the fitting have cylindrical, inner, smooth surfaces 6, and these bores and the pipe 7 are held to tolerances which provide a definite clearance 8 between the internal surfaces 6 of the fittings and the external surface 9 of the pipe. This clearance is not a gap designed to be filled by sealing material or to draw the same by capillary action, but is a provision to allow for expansion of the pipe end when the pipe is heated, and is to be of such order that, when the pipe is heated sufficiently to melt high melting point bond material, the pipe will be expanded into forcible pressure contact with, and intimate heat-transmitting relation to, the fitting surface.

Each of the sockets of the fitting has a broad, heavily thickened hub 10 which includes the end of the socket. In the interior of the socket and inside this heavy section, a small recess is formed, this recess being preferably a circular groove 11. This recess may be approximately midway of the length of the sealing area represented by the telescoped surfaces 6 and 9, though it may be somewhat nearer one end or the other without materially affecting conditions. Within the groove there is an insert 12 of brazing metal. This insert may be a length of wire curved and sprung or expanded into the recess, or it may be rolled into the recess or set therein in any suitable manner, and if desired the recess may be slightly undercut to retain the insert more securely as a part of the fitting.

For copper or brass pipe with bronze or brass fittings the bonding material which I have found to be ideally suited for the successful realization of the objects of the invention is the alloy of silver, copper and phosphorus, known as "Sil-Fos", having the approximate composition, silver 15%, copper 80%, phosphorus 5%. This alloy and various compositions thereof are disclosed in United States Patent 1,829,903. "Sil-Fos" has a melting point of about 1300° F., which is not greatly below the melting points of such fittings and pipe. This accounts for the difficulty which has been experienced in utilizing the material as a bond between pipe fittings and pipe of copper and copper alloy.

I have discovered that by heating largely conveyed through the wall of the pipe into the interior of the fitting and by the resulting expansion of the pipe until its surface presses against the inside surface of the fitting, the braze metal insert can be melted and made ready to flow. Under this method, which depends primarily upon internal surface heat and pressure, the body of the fitting is heated so moderately that injury to the fitting is easily avoided.

An oxyacetylene or like high-temperature torch flame 13 is preferably employed. This flame is applied to the outside of the pipe as indicated in Fig. 1. Since the intense heat of such an agency is quite localized, the direct heating may be applied to the pipe fairly near to the end of the fitting without overheating the fitting. The distance of the flame from the fitting may be of the order of two inches, more or less, but I have demonstrated that the process is entirely practicable if the heat is put into the pipe at quite a considerable distance from the fitting, which in some instances is necessary or desirable, as when a fitting is located inside the woodwork of a building.

The flame is moved more or less around the pipe to equalize the heating circumferentially, though the conduction of heat in the wall of the pipe is such that special care in distributing the applied heating is not required. As the result of this mode of heating, the pipe expands faster than the fitting, or the fitting expands practically not at all. Consequently the portion of the pipe inside the fitting enlarges against the bore of the socket and against the braze metal insert, delivering heat by conduction to both. When the pipe "shows color", the heat of the torch flame is preferably applied to the outside of the thick section 10 of the fitting, as indicated in Fig. 2, just long enough to expand the socket slightly. This does not require any dangerous degree of heat absorption by the cast or forged section. As soon as a very slight annular crevice is formed between the surfaces 6 and 9, or the pressure between them is relieved to an extent, a thin film of the molten brazing material is forced outwardly and inwardly from the supply in the groove and amalgamates with the whole area of the sealing surfaces of pipe and fitting. Notwithstanding that the heating was applied to the pipe outside the fitting, this film penetrates as readily to the inner extremity of the pipe as it does to the outside of the joint, so that when the brazing material appears at the corner 15 between the pipe and the heavy end of the fitting an indication is given that the joint is completely brazed. Some air may enter through the crevice and reach the cavity left in the groove after the latter has been partly emptied of insert metal, though it seems likely that this cavity is occupied by a rarefied atmosphere after the joint has cooled down. It is somewhat difficult to account for the effectual spreading of the bond film between the considerable area of the sealing surfaces without free access of atmospheric pressure to the groove. In the case of a split ring of the insert expanded into the groove, it is to be assumed that some air is present between the insert and the walls of the groove and also between the ends of the ring. It may also be assumed that the braze metal contains occluded gases. While I have not found it necessary to make special provision for an air chamber at the region of the insert, such provision may be made, as illustrated in Fig. 3, for example, where the groove has an air pocket 17 behind the braze metal insert.

The use of a flux is not absolutely necessary, but the end of the pipe is preferably fluxed very thinly before it is inserted into the fitting. Excessive flux would act as an insulator and would tend to retard the flow of heat across the sealing surfaces and into the insert, and would also tend to carry the braze metal out of the seal area.

The procedure that has been described is susceptible of variation. Thus, if after the pipe has been heated, and the flame has then been transferred to the hub of the fitting for a short time, the circle of brazing material should not appear at the outside of the fitting, heating of the pipe may be resumed, after which the fitting may be again moderately heated, until the joint is properly made.

Again, it is not always necessary to apply any flame heat directly to the fitting, though doing so shortens the time for making a joint. I have demonstrated that if a fitting is more or less inaccessible so that it is not feasible to reach it with a torch or there might be danger to inflammable material if that were done, a successful joint can nevertheless be made by simply applying heat to the pipe, and discontinuing this heating after sufficient heat has been absorbed by the pipe and conveyed and transmitted to the inside of the fitting and to the insert. When the heating of the pipe is stopped, the pipe commences to cool and contract, and presently the film of molten brazing metal strikes from the recess between the sealing surfaces.

Still other variations are permissible. Some heat could be applied first to the fitting without necessarily defeating the object of the invention. If the torch flame is directed at the pipe near the fitting, there is necessarily some heating of the fitting simultaneously with the strong heating of the pipe, because of radiation and also because of the spreading of the flame envelope gases. The insert need not actually be brought to fusion by heat conducted in through the pipe wall, since the final degrees of temperature needed for that may be put into the insert by heat applied to the fitting and conducted through its thickness. Finally, the flame might be moved about so that it would be directed now at the pipe and now at the fitting, provided that care be taken to send in so much of the requisite heat along the pipe wall that the fitting be not overheated.

In Fig. 1, which shows the pipe inserted in the fitting preparatory to brazing, the initial clearance is represented rather than shown with accuracy. In Figs. 2 and 4, which show the made joint, the congealed film of bond metal coextensive with the sealing surfaces can be represented only by the lines 18. The film may be exceedingly thin. Since a very high degree of accuracy in the formation of the parts is not required, the film may be more substantial in places than in others, and any pinholes in the parent metals will also be filled by the alloy. It is not to be thought that the interfacial bond metal corresponds in width to the initial clearance. Sections made through the joints indicate that the joining has resulted in a slight permanent expansion of the pipe end inside the fitting. The cavity 20 in the recess, largely discharged of braze metal, is shown. To insure thorough amalgamation between the seal surfaces and to allow for pinholes, there should be an excess of metal in the original braze insert. Consequently, some braze metal remains in the groove, but this is not to be regarded as a waste of material since it remains in the joint, and the retained surplus is slight in contrast to the loss of brazing material which results from other attempted methods of making brazed joints between pipe and pipe fittings.

With this process and these fitting I have had no trouble in making joints that developed the full strength of the pipe, when the pipe was of standard iron pipe size. The shear strength of the joints is such that in a pulling test to destruction the pipe or the fitting parts rather than the joint. A piping assembly made up of standard 1" pipe and fitting will withstand 3000 lbs. hydraulic pressure without failure or leaks in the joints.

The fact that the invention is applicable to iron-pipe sizes and realizes the full strength of the pipe, ordinarily greatly reduced at the threading, is important, not only because most available commercial pipe is of the iron-pipe size but also because piping systems may be subjected to unexpected stresses. Naturally, the invention is entirely applicable to tubing of less wall thickness than standard pipe sizes.

While the invention is now particularly useful in copper, brass and bronze systems, for house service and in the chemical and distillery piping fields, etc., it is not limited thereto, since it is also applicable to ferrous pipe systems, stainless steel and others. I have successfully made joints in accordance with this invention between cast iron fittings and steel pipe, between cast steel fittings and steel pipe, and between stainless steel fittings and stainless steel pipe, using a silver brazing alloy of the approximate composition, silver 50%, cadmium 18%, zinc 16.5%, copper 15.5%, the melting point being about 1160° F. Rather strangely, it seems to be true that ferrous pipe systems may be advantageously bonded with a brazing alloy the melting point of which is somewhat below that of the bonding alloy suitable for cuprous systems. It would appear that with ferrous pipe and fittings, the joint is apt to be poor if the bonding alloy melts above the temperature at which the ferrous metal scales. But for bronze fittings with steel pipe, I have found the "Sil-Fos" alloy to be most satisfactory.

I claim:

1. In the art of making joints in fluid conducting systems and the like, the process of uniting a pipe fitting and an entering pipe member, wherein a local supply of bond metal embedded in the fitting is made to flow and interpenetrate the sealing surfaces by the application of heat, sufficient of which is applied to the pipe member at a region outside the fitting to expand the pipe member forcibly in the fitting and cause heat to be transmitted from the surface of the pipe member to the inside of the fitting and to the insert.

2. In the art of making joints in fluid conducting systems and the like, the process of uniting a pipe fitting and an entering pipe member, wherein a local supply of solid bond metal embedded in the fitting is made to flow and interpenetrate the sealing surfaces, by the application of heat in part to the pipe member outside the fitting and in part to the fitting, the heating being so applied that before the insert is melted the pipe member is expanded tightly in the fitting.

3. In the art of making joints in fluid conducting systems and the like, the process of uniting a pipe fitting and an entering pipe member, which comprises providing a pipe fitting having an insert of bond metal occupying an internal recess, introducing the end of the pipe member into the fitting, applying strong external heating to the pipe member at a region thereof outside the fitting, and thereby expanding the entering portion of the pipe member forcibly against the sealing surface of the fitting and causing heat to be transmitted from the surface of the pipe member to the portion of the inside of the fitting containing the insert, supplying sufficient heat to melt the insert, and relieving the pressure between the sealing surfaces of the pipe member and the fitting so that the molten bond metal leaves its recess and penetrates between said surfaces.

4. In the art of making joints in fluid conducting systems and the like, the process of uniting a pipe fitting and an entering pipe member, which comprises providing a pipe fitting having an insert of bond metal occupying an internal recess, introducing the end of the pipe member into the fitting, applying strong external heating to the pipe member at a region thereof outside the fitting, and thereby expanding the entering portion of the pipe member forcibly against the sealing surface of the fitting and causing heat to be transmitted from the surface of the pipe member to the portion of the inside of the fitting containing the insert, supplying sufficient heat to melt the insert, and by application of heat to the fitting expanding the fitting away from the pipe member so that the molten bond metal leaves its recess and penetrates between the sealing surfaces of the pipe member and the fitting.

5. The process of making a joint between a tubular member and a fitting, which comprises providing a fitting having in an internal recess an insert of bond metal the melting point of which is above 1000° F., introducing the end of a tubular member into the fitting so that it extends inward beyond the insert, an initial clearance being provided between the sealing surfaces of the fitting and the tubular member, putting heat into the tubular member at a region outside the fitting and thereby expanding the pipe inside the fitting to close the clearance gap and cause its surface to press forcibly against the sealing surface of the fitting, whereby the heat conducted through the pipe wall is transmitted to the internal surface of the fitting and to the insert, and after the insert has become melted causing the pressure between the sealing surfaces to be relieved so that a thin film of the bond metal penetrates from the recess between the sealing surfaces and amalgamates therewith.

6. The form of execution of the process of making a joint between a tubular member and a fitting as set forth in claim 4, in which, after the bond metal insert has been melted by heat sent in through the tubular member, the application of heat to the tubular member is discontinued and the member is allowed to shrink so that the penetration takes place.

7. The form of execution of the process of making a joint between a tubular member and a fitting as set forth in claim 4, in which, after the tubular member has been heated and expanded, the application of heat is transferred to the fitting and the latter is heated moderately so as to expand its socket portion slightly, enabling the bond metal to penetrate between the sealing surfaces.

8. In a pipe system, a joint comprising a pipe fitting having a socket formed with a massive enlarged section including the end portion of the socket, a cylindrical internal surface and an internal recess inside said massive section, a tubular member entered within said socket and permanently expanded therein, and a thin film of congealed alloy metal, the melting point of which is above 1000° F., amalgamated with and extending throughout between the sealing surfaces of the socket and tubular member, said film resulting from the expulsion in both directions from said recess of molten alloy metal which initially occupied the recess in solid state.

9. The process of making a joint between a fitting and an entering tubular member, wherein a local supply of solid bond metal held in an internal recess groove of the fitting is made to flow by the application of heat, the heat being applied first to the tubular member at a region outside the fitting until the tubular member is expanded tightly in the fitting, after which heat is applied to the fitting to create a slight clearance, whereby molten bond metal is caused to interpenetrate the sealing surfaces, leaving a void in the groove.

10. As an article of manufacture, a pipe fitting having a cylindrical socket formed with an internal groove, said socket having a massive enlarged section including the end portion of the socket, and said groove being inside said massive section, and an insert of bonding metal the melting point of which is above 1000° F. held in said groove, said socket having expulsion surfaces at opposite sides of said groove, between which and a pipe member molten bond will be expelled from the groove.

WILLIAM R. OST.